United States Patent
Nakamura et al.

(10) Patent No.: US 11,431,924 B2
(45) Date of Patent: Aug. 30, 2022

(54) IMAGE CAPTURING APPARATUS AND CONTROL METHOD THEREOF

(71) Applicant: CANON KABUSHIKI KAISHA, Tokyo (JP)

(72) Inventors: Koki Nakamura, Tokyo (JP); Hisato Sekine, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/143,420

(22) Filed: Jan. 7, 2021

(65) Prior Publication Data

US 2021/0218911 A1 Jul. 15, 2021

(30) Foreign Application Priority Data

Jan. 14, 2020 (JP) .............................. JP2020-003950

(51) Int. Cl.
*H04N 5/341* (2011.01)
*H04N 5/232* (2006.01)
*H04N 5/355* (2011.01)
*H04N 5/235* (2006.01)

(52) U.S. Cl.
CPC ........... *H04N 5/341* (2013.01); *H04N 5/2355* (2013.01); *H04N 5/232122* (2018.08); *H04N 5/35563* (2013.01)

(58) Field of Classification Search
CPC ............. H04N 5/341; H04N 5/232122; H04N 5/2355; H04N 5/35563
USPC ............................................ 348/223.1–229.1
See application file for complete search history.

(56) References Cited

U.S. PATENT DOCUMENTS

2013/0113965 A1\* 5/2013 Takahashi ............ H04N 9/0451
348/294
2015/0312463 A1\* 10/2015 Gupta .................. H04N 5/2355
348/239

FOREIGN PATENT DOCUMENTS

JP 2018-025597 A 2/2018
JP 2019-186910 A 10/2019

\* cited by examiner

*Primary Examiner* — Yogesh K Aggarwal
(74) *Attorney, Agent, or Firm* — Cowan, Liebowitz & Latman, P.C.

(57) ABSTRACT

An image capturing apparatus comprises an image sensor that outputs a first added signal and a first average partial signal amplified by a first gain, and a second added signal and a second averaged partial signal amplified by a second gain, a processing unit that generates a third added signal by synthesizing the first and second added signals with a first ratio and a third averaged partial signal by synthesizing the first and second averaged partial signals with a second or third ratio, a determination unit that determines the first ratio based on the first or second added signal and determines the second ratio based on the first ratios, and changes the second ratio of a pixel group that includes a pixel corresponding to the saturated first or second added signal to the third ratio, which is not based on the first ratio.

8 Claims, 5 Drawing Sheets

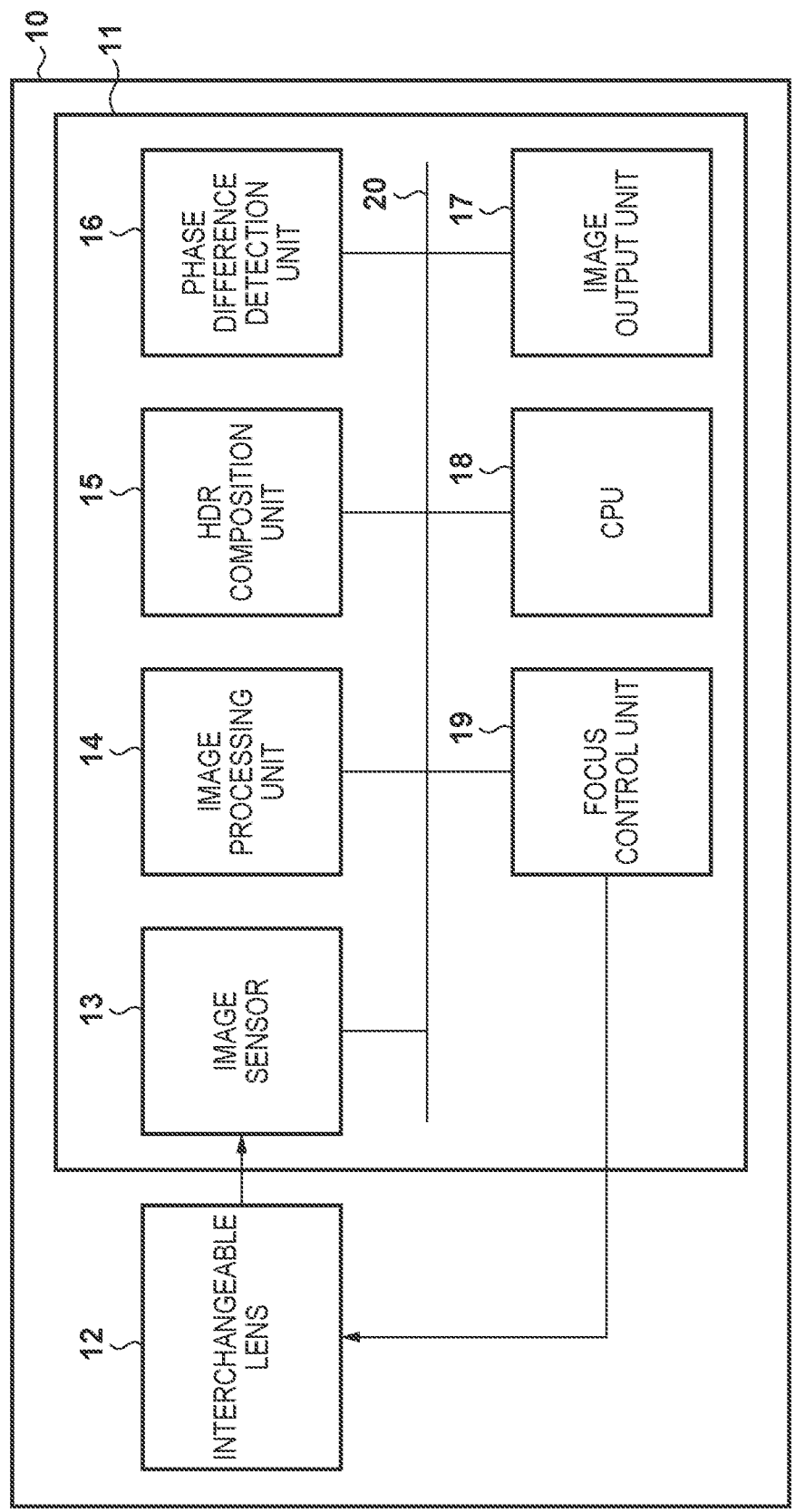

| R0<br>A+B | Gr0<br>A+B | R1<br>A+B | Gr1<br>A+B |
|---|---|---|---|
| Gb0<br>A+B | B0<br>A+B | Gb1<br>A+B | B1<br>A+B |

| R0<br>A+B | Gr0<br>A+B | R1<br>A+B | Gr1<br>A+B |
|---|---|---|---|
| Gb0<br>A+B | B0<br>A+B | Gb1<br>A+B | B1<br>A+B |

…

IMAGE CAPTURING APPARATUS AND CONTROL METHOD THEREOF

BACKGROUND OF THE INVENTION

Field of the Invention

The present invention relates to an image capturing apparatus and a control method thereof, and more particularly to an on-imaging plane phase difference focus detection technique when a dynamic range is expanded.

Description of the Related Art

In recent years, there is an image capturing apparatus that, in order to expand the dynamic range of an image, outputs a dark image and a bright image from an image sensor and performs high dynamic range composition (hereinafter, referred to as "HDR composition") using the two images.

As an example of an image sensor that outputs images having different brightness, Japanese Patent Laid-Open No. 2019-186910 discloses the following image sensor. That is, each pixel has two photoelectric conversion units and is capable of outputting an image signal and a focus detection signal. Then, by applying two different gains to each signal, four types of signals with two different kinds of brightness are output. Then, by synthesizing the obtained image signals and the focus detection signals having two different kinds of brightness, an image signal and a focus detection signal having an expanded dynamic range are acquired. Further, it is disclosed that focus detection by a phase difference method (hereinafter, referred to as "on-imaging plane phase difference AF") is performed using focus detection signals having two kinds of brightness.

On the other hand, the following technique is disclosed in Japanese Patent Laid-Open No. 2018-25597 as a method for performing autofocus using a plurality of image data having different brightness. That is, AF evaluation values are calculated using a contrast method based on a plurality of image data, respectively, and the AF evaluation value to be used for autofocus is selected from the calculated AF evaluation values based on the saturation state of the plurality of image data.

However, Japanese Patent Laid-Open Nos. 2019-186910 and 2018-25597 do not describe a case where at least one of the focus detection signals having two kinds of brightness contains a saturated signal, and it was unclear how to reduce the effect of a saturated signal on the on-imaging plane phase difference AF.

SUMMARY OF THE INVENTION

The present invention has been made in consideration of the above situation, and performs on-imaging plane phase difference AF where effects of saturated signals are reduced using focus detection signals of different luminances.

According to the present invention, provided is an image capturing apparatus comprising: an image sensor having a plurality of pixels arranged in a matrix and each provided with a plurality of photoelectric conversion units, and outputs a first added signal and a first average partial signal and a second added signal and a second averaged partial signal, where the first added signal is obtained by amplifying, with a first gain, an added signal of each pixel obtained by adding signals output from the plurality of photoelectric conversion units for each pixel, the first averaged partial signal is obtained by amplifying, with the first gain, an averaged partial signal obtained by averaging partial signals output from part of the plurality of photoelectric conversion units for each group of predetermined number of pixels, the second added signal is obtained by amplifying the added signal with a second gain which is different from the first gain, and the second averaged partial signal is obtained by amplifying the averaged partial signal with the second gain; a processing unit that generates a third added signal for each pixel by synthesizing the first added signal and the second added signal with a predetermined first ratio and generates a third averaged partial signal by synthesizing the first averaged partial signal and the second averaged partial signal with a predetermined second ratio or third ratio; a determination unit that determines the first ratio for each pixel based on the first added signal or the second added signal and determines the second ratio based on the first ratios of a plurality of pixels included in the each group; and a focus detection unit that performs phase difference focus detection using the third added signal and the third averaged partial signal, wherein, in a case where the first added signal or the second added signal is saturated, the determination unit changes the second ratio of the group that includes a pixel corresponding to the saturated first added signal or the saturated second added signal to the third ratio which is not based on the first ratio, and wherein each unit is implemented by one or more processors, circuitry or a combination thereof.

Further, according to the present invention, provided is a control method of an image capturing apparatus comprising an image sensor having a plurality of pixels arranged in a matrix and each provided with a plurality of photoelectric conversion units, and outputs a first added signal and a first average partial signal and a second added signal and a second averaged partial signal, where the first added signal is obtained by amplifying, with a first gain, an added signal of each pixel obtained by adding signals output from the plurality of photoelectric conversion units for each pixel, the first averaged partial signal is obtained by amplifying, with the first gain, an averaged partial signal obtained by averaging partial signals output from part of the plurality of photoelectric conversion units for each group of predetermined number of pixels, the second added signal is obtained by amplifying the added signal with a second gain which is different from the first gain, and the second averaged partial signal is obtained by amplifying the averaged partial signal with the second gain, said method comprising: generating a third added signal for each pixel by synthesizing the first added signal and the second added signal with a predetermined first ratio and generating a third averaged partial signal by synthesizing the first averaged partial signal and the second averaged partial signal with a predetermined second ratio or third ratio; determining the first ratio for each pixel based on the first added signal or the second added signal and determining the second ratio based on the first ratios of a plurality of pixels included in the each group; changing, in a case where the first added signal or the second added signal is saturated, the second ratio of the group that includes a pixel corresponding to the saturated first added signal or the saturated second added signal to the third ratio which is not based on the first ratio; and performing phase difference focus detection using the third added signal and the third averaged partial signal.

Furthermore, according to the present invention, provided is a non-transitory computer-readable storage medium, the storage medium storing a program that is executable by the computer, wherein the program includes program code for causing the computer to execute a control method of an image capturing apparatus comprising an image sensor having a plurality of pixels arranged in a matrix and each provided with a plurality of photoelectric conversion units, and outputs a first added signal and a first average partial signal and a second added signal and a second averaged partial signal, where the first added signal is obtained by amplifying, with a first gain, an added signal of each pixel obtained by adding signals output from the plurality of photoelectric conversion units for each pixel, the first averaged partial signal is obtained by amplifying, with the first gain, an averaged partial signal obtained by averaging partial signals output from part of the plurality of photoelectric conversion units for each group of predetermined number of pixels, the second added signal is obtained by amplifying the added signal with a second gain which is different from the first gain, and the second averaged partial signal is obtained by amplifying the averaged partial signal with the second gain, said method comprising: generating a third added signal for each pixel by synthesizing the first added signal and the second added signal with a predetermined first ratio and generating a third averaged partial signal by synthesizing the first averaged partial signal and the second averaged partial signal with a predetermined second ratio or third ratio; determining the first ratio for each pixel based on the first added signal or the second added signal and determining the second ratio based on the first ratios of a plurality of pixels included in the each group; changing, in a case where the first added signal or the second added signal is saturated, the second ratio of the group that includes a pixel corresponding to the saturated first added signal or the saturated second added signal to the third ratio which is not based on the first ratio; and performing phase difference focus detection using the third added signal and the third averaged partial signal.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a block diagram showing a configuration of an image capturing system according to an embodiment of the present invention;

DESCRIPTION OF THE EMBODIMENTS

Figure 2A:
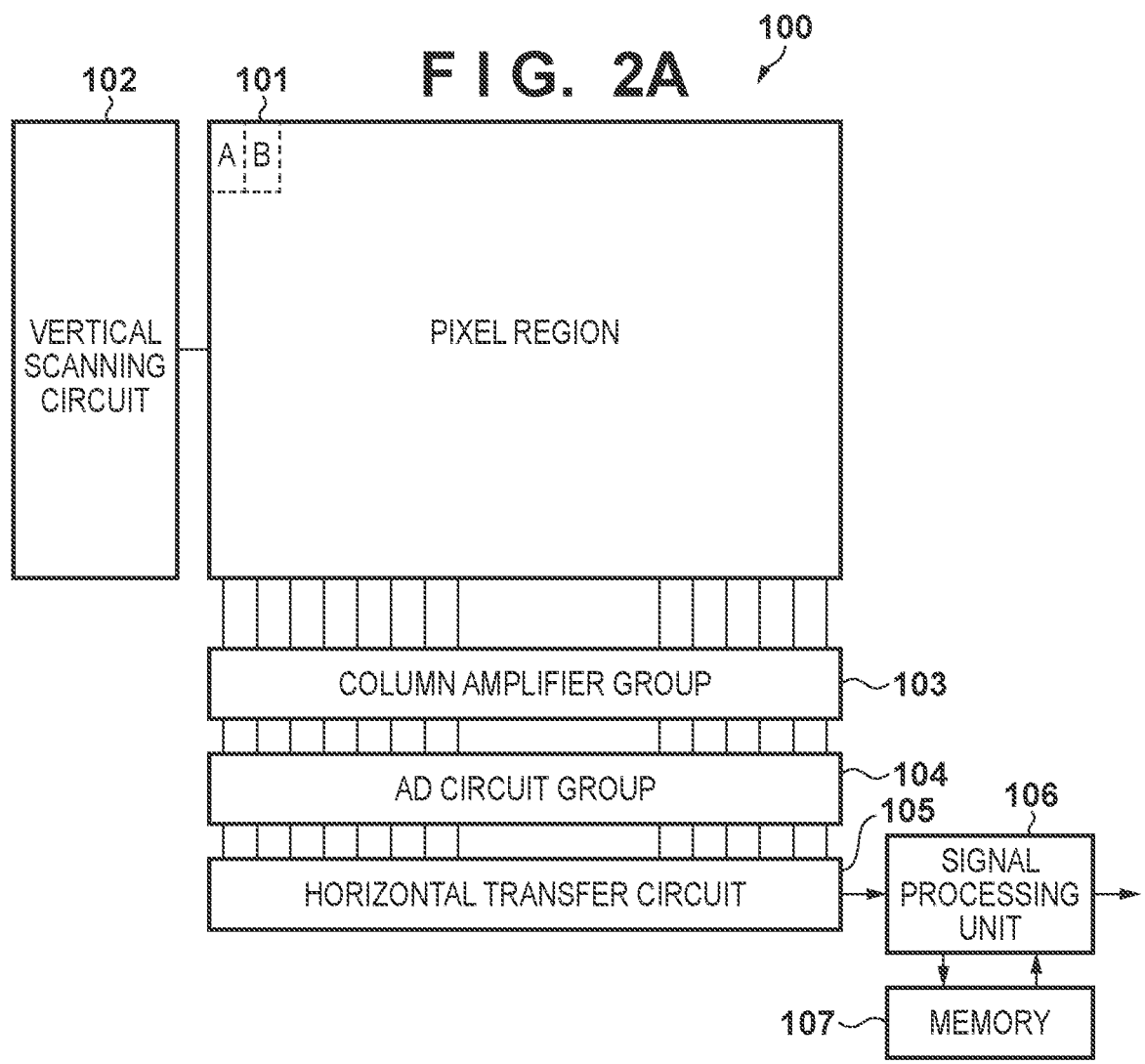
FIGS. 2A and 2B are diagrams showing a schematic configuration of an image sensor according to the embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a block diagram of an image capturing system 10 according to an embodiment of the present invention, and the image capturing system 10 is mainly composed of a main body 11 and an interchangeable lens 12 that can be attached to and detached from the main body 11.

The interchangeable lens 12 is a photographing lens composed of a plurality of lens groups, and includes a focus lens, a zoom lens, a shift lens, and a diaphragm. The interchangeable lens 12 can change the position of the focus lens based on an electric signal from a focus control unit 19 described later.

The main body 11 includes an image sensor 13, an image processing unit 14, an HDR composition unit 15, a phase difference detection unit 16, an image output unit 17, a CPU 18, the focus control unit 19, and a bus 20. The connection portions of the interchangeable lens 12 and the image output unit 17 are exposed on the surface of the main body 11.

The image sensor 13 has a configuration in which a plurality of pixels each having a plurality of photoelectric conversion elements are arranged in a two-dimensional manner. The image sensor 13 photoelectrically converts an optical image of a subject formed by the interchangeable lens 12 in each pixel, performs analog-to-digital conversion by an AD circuit group 104 described later, and outputs an image signal (RAW image data). The detailed configuration and operation of the image sensor 13 will be described later with reference to FIGS. 2A to 4. Briefly, the image sensor 13 outputs two types of image signals and two types of signals for phase difference detection (hereinafter, referred to as "phase difference detection signals") corresponding to the image signals to which different gains (low gain and high gain) are applied as RAW image data.

The image processing unit 14 corrects the level difference caused by the image sensor 13. For example, the pixels in the optical black (OB) region are used to correct the signal levels of the pixels in the effective region, and signals from defective pixels are corrected by using signals from the pixels around the defective pixels. In addition, processes such as correction for vignetting, color correction, contour enhancement, noise reduction, gamma correction, and application of gain are performed. The image processing unit 14 performs these processes on the RAW image data output from the image sensor 13 and outputs the corrected image data to appropriate units.

The HDR composition unit 15 uses two image signals processed with a low gain and a high gain by the image processing unit 14 to perform dynamic range expansion composition (HDR composition) at a ratio according to their luminances. The HDR composition unit 15 also performs the HDR composition on two phase difference detection signals processed with the low gain and the high gain at a ratio according to their luminances. The details of the processing by the HDR composition unit 15 in this embodiment will be described later with reference to FIG. 5.

The phase difference detection unit 16 calculates a defocus amount using the HDR-synthesized image signal and phase difference detection signal from the HDR composition unit 15 and outputs the defocus amount to the CPU 18. The CPU 18 adjusts the focus by controlling the interchangeable lens 12 via the focus control unit 19 according to the defocus amount obtained by the phase difference detection unit 16.

The image output unit 17 outputs the image signal synthesized by the HDR composition unit 15 to the outside of the image capturing system 10. In addition to the focus adjustment described above, the CPU 18 controls each part of the image capturing system 10 according to a control software.

Each of the components described above is connected to the internal bus 20 which is a transmission line for control signals and data signals between the components.

Next, the configuration and reading method of the image sensor 13 will be explained. FIG. 2A is a diagram showing a configuration example of the image sensor 13 according to the embodiment of the present invention.

In a pixel region 100, a plurality of pixels 101 formed with photodiodes for photoelectric conversion and so forth are arranged in a matrix. The pixel 101 is composed of a photoelectric conversion unit A and a photoelectric conversion unit B for phase difference detection with respect to one microlens 111 described later, and the in-focus position can be detected by finding a phase difference between image signals obtained from the photoelectric conversion unit A and the photoelectric conversion unit B.

Figure 2B:
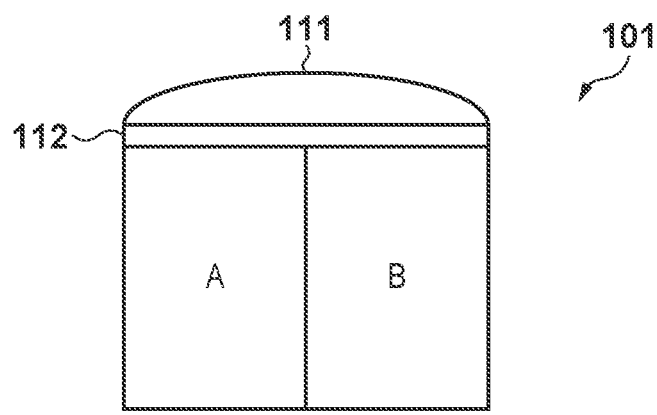

FIG. 2B is a conceptual diagram showing a cross section of the pixel 101, and shows that two photoelectric conversion units, namely the photoelectric conversion unit A and the photoelectric conversion unit B, each having a photodiode, are configured under one microlens 111. Further, each pixel 101 is provided with a color filter 112. In general, it is common to use an RGB primary color filter of Bayer arrangement where one of the three colors R (red), G (green), and B (blue) corresponds to each pixel, but the present invention is not limited this.

A vertical scanning circuit 102 performs timing control for sequentially reading out the pixel signals accumulated respectively in the photoelectric conversion units A and the photoelectric conversion units B in the pixel region 100. Generally, the pixel signals are sequentially read out line by line from the upper row to the lower row. In the present embodiment, the vertical scanning circuit 102 controls to read out, from each pixel 101, a phase difference detection signal (A signal) which is a signal (partial signal) of the photoelectric conversion unit A that is a part of the pixel 101, and an added signal (A+B signal) obtained by combining signals of the photoelectric conversion unit A and the photoelectric conversion unit B. By reading signals in this way, the A+B signal can be used as it is as an image signal, and a B signal can be acquired by subtracting the A signal from the A+B signal to obtain a pair of phase difference detection signals, and the focus detection by the on-imaging plane phase difference method (on-imaging plane phase difference AF) can be performed. Note that, when the on-imaging plane phase difference AF is not performed, only the A+B signal may be read out.

A column amplifier group 103 is composed of a plurality of column amplifiers each configured for each column of the pixel region 100, and is used to electrically amplify the signals read out from the pixel region 100. By amplifying signals in the column amplifier group 103, the signal levels of the pixels are amplified with respect to the noise generated in the AD circuit group 104 in the subsequent stage, and the S/N ratio can be improved equivalently. The column amplifier group 103 can amplify signals using a plurality of different gains, and in the present embodiment, the dynamic range is expanded by synthesizing the signals amplified by different gains in the HDR composition unit 15.

The AD circuit group 104 is composed of a plurality of AD circuits each configured for each column of the pixel region 100, and converts the signals amplified by the column amplifier group 103 into digital signals. The pixel signals converted into digital signals are sequentially read out by a horizontal transfer circuit 105 and input to a signal processing unit 106. The signal processing unit 106 is a circuit that performs digital signal processing, and in addition to performing offset correction such as FPN correction in digital processing, gain calculation can be easily performed by performing shift calculation and multiplication. After undergoing respective processes, the signals are output to the outside of image sensor 13.

A memory 107 has a function of temporarily holding the A signals, A+B signals, or the like read out from the pixel region 100 and processed by the column amplifier group 103, the AD circuit group 104, and the signal processing unit 106.

In the example shown in FIG. 2B, each pixel 101 has two photoelectric conversion unit A and photoelectric conversion unit B for one microlens 111, but the number of photoelectric conversion units is not limited to two, and three or more photoelectric conversion units may be arranged in each pixel 101. Further, the pupil division direction may be horizontal or vertical, or may be mixed. Further, a plurality of pixels having different aperture positions of the light receiving portion with respect to the microlens 111 may be provided. That is, any configuration may be used as long as a pair of phase difference detection signals such as an A signal and a B signal can be obtained as a result. Further, the present invention is not limited to a configuration in which all the pixels have a plurality of photoelectric conversion units, and a configuration in which pixels as shown in FIG. 2B are discretely provided in the normal pixels constituting the image sensor 13 may be used. Further, a plurality of types of pixels divided differently may be included in the same image sensor 13.

Figure 3A:
FIGS. 3A and 3B are diagrams showing the concept of a signal output from the image sensor according to the embodiment.
Figure 3B:

FIGS. 3A and 3B are diagrams showing the A+B signals and the A signals output from the image sensor 13. FIG. 3A represents high gain A+B signals and A signal, and FIG. 3B represents low gain A+B signals and A signal. From the image sensor 13, the A signal for one pixel is output with respect to the A+B signals for eight pixels, with eight pixels being as one group. At this time, the A signal is an average value obtained by adding up all the A signals corresponding to the A+B signals for 8 pixels and dividing the sum by 8. Hereinafter, "A signal" indicates the average value of the A signals of each group (averaged partial signal).

Figure 4:
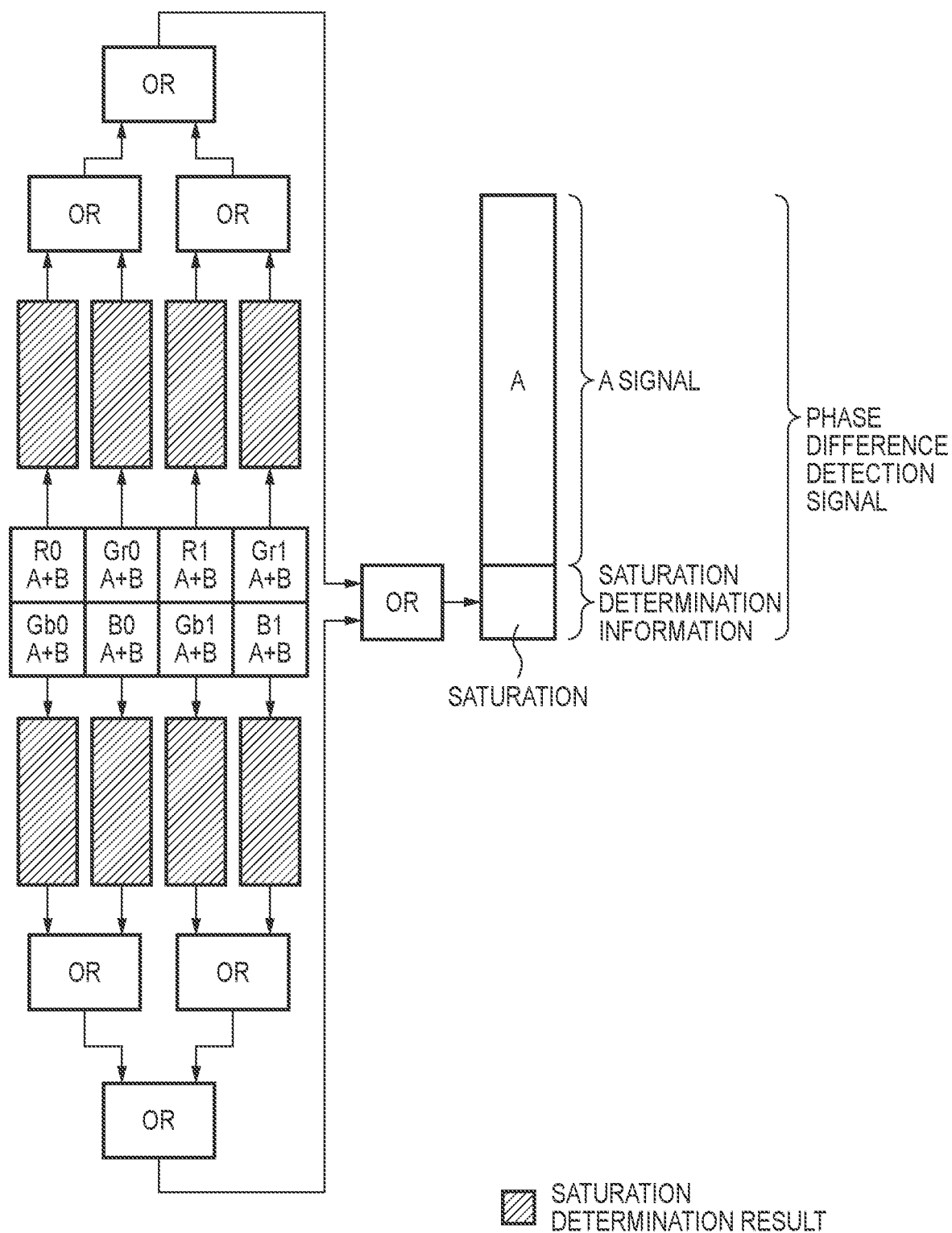
FIG. 4 is a diagram for explaining saturation determination information for a phase difference detection signal according to the embodiment.

Further, the phase difference detection signals output from the image sensor 13 includes saturation determination information in addition to the A signals. FIG. 4 is a diagram showing the concept of an A signal output from the image sensor 13 and the method of generating the saturation determination information. The image sensor 13 performs saturation determination for each A+B signal, and outputs 1 if it is saturated and outputs 0 if it is not saturated, as information of the corresponding pixels. Then, the image sensor 13 outputs the logical sum of the saturation determination results of the 8 pixels corresponding to the A signal as 1-bit saturation determination information together with the A signal.

The HDR composition unit 15 determines a coefficient $\alpha$ so as to have a ratio corresponding to the luminance of the input A+B signals, and performs HDR composition. The HDR composition unit 15 multiplies the input high gain A+B signal by a coefficient $(1-\alpha)$ and the low gain A+B signal by the coefficient $\alpha$, adds the products, and outputs the sum for each pixel. Hereinafter, the HDR-synthesized A+B signal is referred to as a "composite A+B signal". The above HDR synthesis can be expressed by the following equation (1).

$$\text{(Composite } A+B \text{ signal)}=\text{(High gain } A+B \text{ signal)}\times(1-\alpha)+\text{(Low gain } A+B \text{ signal)}\times\alpha \quad (1)$$

At this time, the value of the coefficient α is linearly changed between 0 and 1 according to the magnitude of the luminance of the A+B signals. Here, the coefficient α is increased as the luminance of the high gain A+B signal or the low gain A+B signal increases.

Here, a case where the HDR composition unit 15 multiplies the input high gain A signal by the coefficient (1−α') and the low gain A signal by the coefficient α', adds the products, and output the sum is considered as for the A signal similarly to the A+B signal. The value of the coefficient α' is the average value of the coefficients α of 8 pixels corresponding to the A signal. Hereinafter, the HDR-synthesized A signal is referred to as a "composite A signal". That is, this HDR synthesis can be expressed by the following equation (2).

$$\text{(Composite } A \text{ signal)}=\text{(High gain } A \text{ signal)}\times(1-\alpha')+\text{(Low gain } A \text{ signal)}\times\alpha' \quad (2)$$

Here, among the high gain A+B signals of eight pixels, a case where only one pixel is saturated and the luminance of the other seven pixels is low is considered. In this case, the corresponding high gain A signal also contains data of the saturated pixel. Since the coefficients α of the other seven non-saturated pixels are low, the value of the coefficient α' is also low, and the composite A signal synthesized by the HDR composition unit 15 results in containing a large percentage of component of the high gain A signal that contains the data of the saturated pixel. As a result, it is not possible to obtain correct correlation between the composite A signal, which contains data of a saturated pixel, and the composite A+B signal, so the phase difference detection unit 16 cannot calculate a correct defocus amount.

Accordingly, in the present embodiment, the HDR composition unit 15 changes the coefficient α' at the time of HDR-synthesizing the high gain A signal and the low gain A signal based on the saturation determination information of the A signal.

Figure 5:
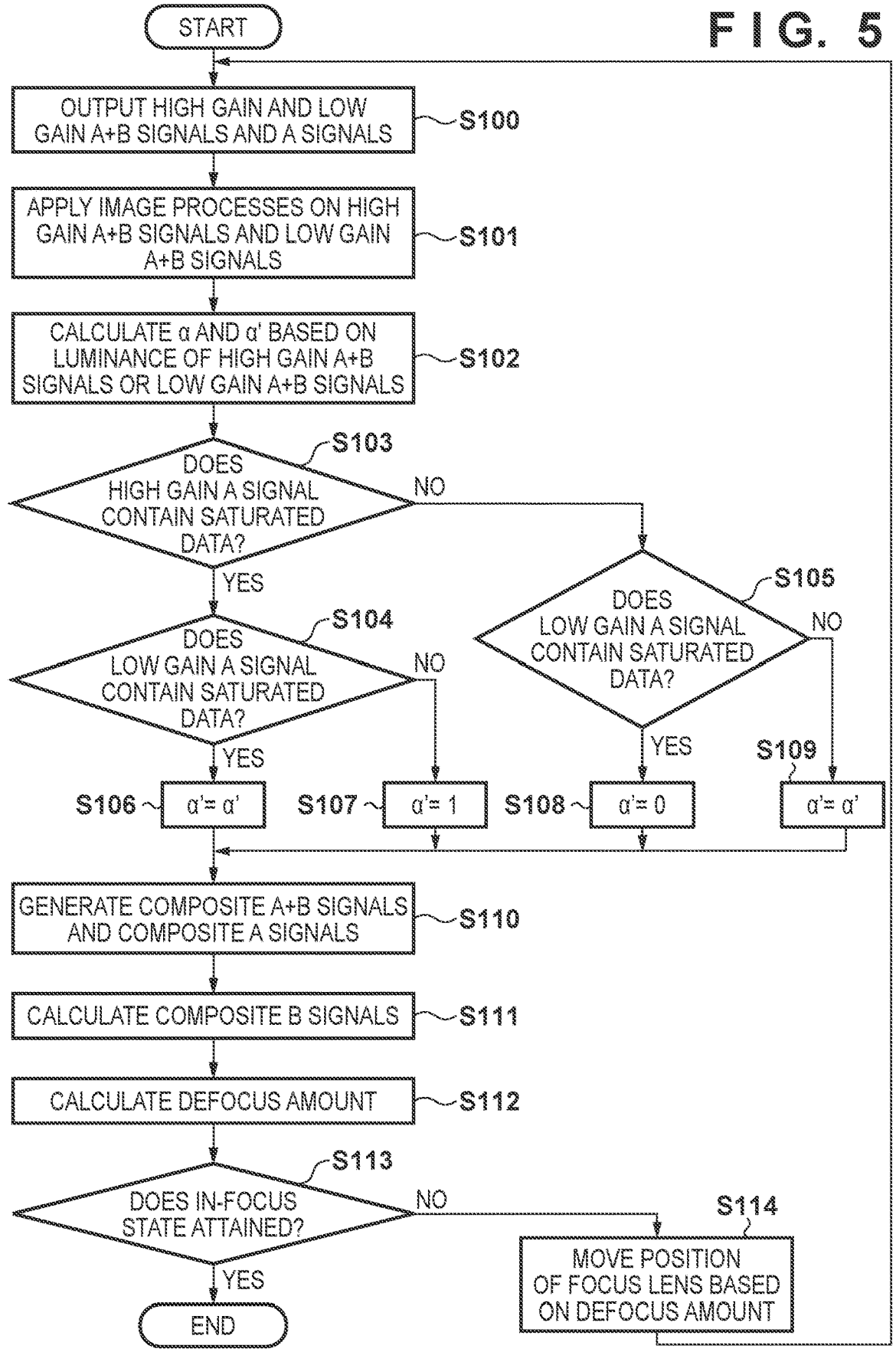
FIG. 5 is a flowchart of a focus adjustment processing according to an embodiment.

Next, the operation of the on-imaging plane phase difference AF according to the present embodiment will be described with reference to FIG. 5. FIG. 5 is a flowchart showing the operation of the main body 11.

In step S100, the image sensor 13 photoelectrically converts an optical image of a subject formed by the interchangeable lens 12 in each pixel. Furthermore, analog-to-digital conversion is performed by the AD circuit group 104, and high gain A+B signals, low gain A+B signals, high gain A signals and low gain A signals each for one pixel every eight pixels are output. Then, the process proceed to step S101.

In step S101, the image processing unit 14 applies level correction to the high gain A+B signals and the low gain A+B signals from the pixels in the effective region, correction to the high gain A+B signals and the low gain A+B signals from defective pixels using their peripheral pixels, and correction for vignetting, color correction, contour enhancement, noise removal, and gamma correction to the high gain A+B signals and the low gain A+B signals. Then, the low gain A+B signals and the low gain A signals are gain-corrected, so as to match the gain to the gain of the high gain A+B signals and the high gain A signals. Then, the process proceeds to step S102.

In step S102, the HDR composition unit 15 calculates the coefficients α to be used for the synthesis according to the luminance of the high gain A+B signals or low gain A+B signals of 8-pixels processed by the image processing unit 14. Then, the coefficient α' is obtained by adding the eight coefficients α for every eight pixels and dividing the sum by 8, and the process proceeds to step S103.

In step S103, the HDR composition unit 15 determines whether the high gain A signal contains saturated data based on the saturation determination information of the high gain A signal. If the high gain A signal contains saturated data, the process proceeds to step S104, and if the high gain A signal does not contain saturated data, the process proceeds to step S105.

In step S104, the HDR composition unit 15 determines whether the low gain A signal contains saturated data based on the saturation determination information of the low gain A signal. If the low gain A signal contains saturated data, the process proceeds to step S106, and if the low gain A signal does not contain saturated data, the process proceeds to step S107.

Since both the high gain A signal and the low gain A signal include saturated data in step S106, the HDR composition unit 15 holds the value of the coefficient α' calculated in step S102 and the process proceeds to step S110.

In step S107, the HDR composition unit 15 changes the value of the coefficient α' calculated in step S102 to 1. When step S107 is carried out, since the high gain A signal contains saturated data and the low gain A signal does not contain saturated data, the coefficient α' is changed to 1 so that the synthesis result does not include the high gain A signal, and the process proceeds to step S110.

On the other hand, in step S105, the HDR composition unit 15 determines whether the low gain A signal contains saturated data based on the saturation determination information of the low gain A signal. If the low gain A signal contains saturated data, the process proceeds to step S108, and if the low gain A signal does not contain saturated data, the process proceeds to step S109.

In step S108, since the high gain A signal does not contain saturated data and the low gain A signal contains saturated data, the HDR composition unit 15 changes the coefficient α' to 0 so that the synthesis result does not include the low gain A signal, and the process proceeds to step S110.

In step S109, neither the high gain A signal nor the low gain A signal contains saturated data, so the HDR composition unit 15 holds the value of the coefficient α' calculated in step S102, and the process proceeds to step S110.

In step S110, for each of the eight pixels, the HDR composition unit 15 multiplies the low gain A+B signal by the coefficient α and the high gain A+B signal by the coefficient (1−α), and adds the products to generate the composite A+B signal. Further, the HDR composition unit 15 multiplies the low gain A signal by the coefficient α', and the high gain A signal by a coefficient (1−α'), and adds the products to generate the composite A signal. After that, the process proceeds to step S111.

In step S111, the phase difference detection unit 16 calculates the B signals by subtracting the composite A signal from each of the composite A+B signals of 8 corresponding pixels, adds up the calculated B signals of the 8 pixels and calculates an average value by dividing the sum by 8. Hereinafter, this average value is referred to as a "composite B signal".

Next, in step S112, the phase difference detection unit 16 calculates a defocus amount by the on-imaging plane phase difference AF using the composite A signals and the composite B signals.

In step S113, the CPU 18 determines whether the subject is in focus from the calculated defocus amount. If it is in focus, the processing ends, and if it is not in focus, the process proceeds to step S114.

In step S114, the focus control unit 19 changes the position of the focus lens included in the interchangeable lens 12 according to the defocus amount, and the process returns to step S100, and the above processes are repeated.

By the above operation, even in a case where only one pixel of the high gain A+B signal is saturated and the luminance of the other 7 pixels is low, the phase difference detection unit 16 can calculate a correct defocus amount without being affected by the data of the saturated pixel, and thus the on-imaging plane phase difference AF can be performed correctly.

In the present embodiment, the A signal for one pixel is output with respect to the A+B signals for eight pixels output from the image sensor 13, but the present invention is not limited to this. The corresponding number of pixels to the A signal may be changed according to the frame rate of the image output from the image sensor 13 and the total number of pixels read out in one frame period.

Further, although the coefficient α' is described as a simple average value of the coefficients α of the corresponding pixels, it may be a weighted average value according to the luminance sensitivity of each color.

Other Embodiments

Embodiment(s) of the present invention can also be computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-003950, filed on Jan. 14, 2020 which is hereby incorporated by reference herein in its entirety.

What is claimed is:

1. An image capturing apparatus comprising:
an image sensor having a plurality of pixels arranged in a matrix and each provided with a plurality of photoelectric conversion units, and outputs a first added signal and a first average partial signal and a second added signal and a second averaged partial signal, where the first added signal is obtained by amplifying, with a first gain, an added signal of each pixel obtained by adding signals output from the plurality of photoelectric conversion units for each pixel, the first averaged partial signal is obtained by amplifying, with the first gain, an averaged partial signal obtained by averaging partial signals output from part of the plurality of photoelectric conversion units for each group of predetermined number of pixels, the second added signal is obtained by amplifying the added signal with a second gain which is different from the first gain, and the second averaged partial signal is obtained by amplifying the averaged partial signal with the second gain;
a processing unit that generates a third added signal for each pixel by synthesizing the first added signal and the second added signal with a first ratio and generates a third averaged partial signal by synthesizing the first averaged partial signal and the second averaged partial signal with a second ratio or third ratio;
a determination unit that determines the first ratio for each pixel based on the first added signal or the second added signal and determines the second ratio based on the first ratios of a plurality of pixels included in the each group, or determines the third ratio which is not based on the first ratio for the group containing saturated data; and
a focus detection unit that performs phase difference focus detection using the third added signal and the third averaged partial signal,
wherein each unit is implemented by one or more processors, circuitry or a combination thereof.

2. The image capturing apparatus according to claim 1, wherein
the second gain is smaller than the first gain, and
the third ratio makes a ratio of the first averaged partial signal or a ratio of the second averaged partial signal becomes 0.

3. The image capturing apparatus according to claim 1, wherein the determination unit determines the second ratio by averaging the first ratios of the plurality of pixels included in the each group.

4. The image capturing apparatus according to claim 1, wherein
the plurality of pixels are respectively covered with color filters of a plurality of color, and
the determination unit determines the second ratio by weighted-averaging the first ratios of the plurality of pixels included in the each group based on luminance sensitivity of each color of the color filters.

5. The image capturing apparatus according to claim 1, wherein the determination unit determines the first ratio so that the larger the first added signal or the second added signal is, the larger a ratio of the first added signal becomes.

6. The image capturing apparatus according to claim 1, wherein
the determination unit determines the group being saturated based on saturated information output from the image sensor, which is appended to the first averaged partial signal and the second averaged partial signal.

7. A control method of an image capturing apparatus comprising an image sensor having a plurality of pixels arranged in a matrix and each provided with a plurality of photoelectric conversion units, and outputs a first added signal and a first average partial signal and a second added signal and a second averaged partial signal, where the first added signal is obtained by amplifying, with a first gain, an added signal of each pixel obtained by adding signals output from the plurality of photoelectric conversion units for each pixel, the first averaged partial signal is obtained by amplifying, with the first gain, an averaged partial signal obtained by averaging partial signals output from part of the plurality of photoelectric conversion units for each group of predetermined number of pixels, the second added signal is obtained by amplifying the added signal with a second gain which is different from the first gain, and the second averaged partial signal is obtained by amplifying the averaged partial signal with the second gain, said method comprising:

generating a third added signal for each pixel by synthesizing the first added signal and the second added signal with a first ratio and generating a third averaged partial signal by synthesizing the first averaged partial signal and the second averaged partial signal with a second ratio or third ratio;

determining the first ratio for each pixel based on the first added signal or the second added signal and determining the second ratio based on the first ratios of a plurality of pixels included in the each group, or determining the third ratio which is not based on the first ratio for the group containing saturated data; and performing phase difference focus detection using the third added signal and the third averaged partial signal.

8. A non-transitory computer-readable storage medium, the storage medium storing a program that is executable by the computer, wherein the program includes program code for causing the computer to execute a control method of an image capturing apparatus comprising an image sensor having a plurality of pixels arranged in a matrix and each provided with a plurality of photoelectric conversion units, and outputs a first added signal and a first average partial signal and a second added signal and a second averaged partial signal, where the first added signal is obtained by amplifying, with a first gain, an added signal of each pixel obtained by adding signals output from the plurality of photoelectric conversion units for each pixel, the first averaged partial signal is obtained by amplifying, with the first gain, an averaged partial signal obtained by averaging partial signals output from part of the plurality of photoelectric conversion units for each group of predetermined number of pixels, the second added signal is obtained by amplifying the added signal with a second gain which is different from the first gain, and the second averaged partial signal is obtained by amplifying the averaged partial signal with the second gain, said method comprising:

generating a third added signal for each pixel by synthesizing the first added signal and the second added signal with a first ratio and generating a third averaged partial signal by synthesizing the first averaged partial signal and the second averaged partial signal with a second ratio or third ratio;

determining the first ratio for each pixel based on the first added signal or the second added signal and determining the second ratio based on the first ratios of a plurality of pixels included in the each group, or determining the third ratio which is not based on the first ratio for the group containing saturated data; and performing phase difference focus detection using the third added signal and the third averaged partial signal.

* * * * *